(12) United States Patent
Hibi

(10) Patent No.: US 6,862,047 B2
(45) Date of Patent: Mar. 1, 2005

(54) IMAGE PROJECTION APPARATUS (75) Inventor: Taketoshi Hibi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 395 days.

(21) Appl. No.: 09/933,198

(22) Filed: Aug. 21, 2001

(65) Prior Publication Data
US 2002/0130977 A1 Sep. 19, 2002

(30) Foreign Application Priority Data

Mar. 12, 2001 (JP) ........................................ 2001-068059

(51) Int. Cl.⁷ ................................................ H04N 9/12
(52) U.S. Cl. ..................... 348/743; 348/742; 348/744; 348/759
(58) Field of Search ................................ 348/742, 743, 348/759, 760, 761, 771; 353/31, 121, 34, 37, 84; H04N 9/12

(56) References Cited

U.S. PATENT DOCUMENTS

| | | | |
|---|---|---|---|
| 5,233,385 A | | 8/1993 | Sampsell |
| 5,357,288 A | * | 10/1994 | Hiroshima et al. .......... 348/742 |
| 5,387,920 A | * | 2/1995 | Bos et al. ....................... 345/88 |
| 5,592,188 A | | 1/1997 | Doherty et al. |
| 5,917,558 A | * | 6/1999 | Stanton ....................... 348/743 |
| 5,921,650 A | | 7/1999 | Doany et al. |
| 6,147,720 A | | 11/2000 | Guerinot et al. |
| 6,392,717 B1 | * | 5/2002 | Kunzman .................... 348/744 |
| 6,593,985 B1 | * | 7/2003 | Taira et al. .................. 349/119 |
| 6,597,409 B1 | * | 7/2003 | Shioya et al. ................ 348/743 |

* cited by examiner

Primary Examiner—John Miller
Assistant Examiner—Trang U. Tran
(74) Attorney, Agent, or Firm—Birch, Stewart, Kolasch & Birch LLP (57) ABSTRACT In a color image projection apparatus using a color wheel to illuminate a spatial optical modulator with light in color sequence, light reflected from the color wheel is added to light having passed through the color wheel, and the combined light is spatially modulated by the spatial optical modulator to form an image. If the light reflected a the incident surface of the color wheel is guided to the exit surface of the color wheel, and combined with the light having passed through the color wheel, the light utilization efficiency is improved. Any type of images can be projected with improved brightness.

39 Claims, 9 Drawing Sheets

CONVENTIONAL ART

FIG.9

CONVENTIONAL ART

FIG.10

CONVENTIONAL ART

FIG.11

CONVENTIONAL ART

FIG. 12

CONVENTIONAL ART

FIG. 13

CONVENTIONAL ART

IMAGE PROJECTION APPARATUS

BACKGROUND OF THE INVENTION

The present invention relates to an image processing apparatus used for projection television or the like.

Various types of image projection apparatuses are used for projection television or the like, with the type of the image projection apparatus adopted being decided according to the intended use. Among them, the system in which the projected image is formed by a one-plane spatial optical modulator uses less elements and can be realized at a lower cost than the system in which three planes of spatial optical modulators are used for the respective ones of the primary colors. For this reason, they are widely used. When a multi-color image is projected by the use of a one-plane spatial optical modulator, projection images of the three primary colors of red, green and blue are formed by the method of time division or spatial division, and any desired color is projected by additive mixing. The method in which the primary color light components are projected by the time division can realize image projection without altering the number of pixels of the spatial optical modulator, and is therefore advantageous in projecting television signals which require a high definition, such as the television signals according to the HDTV (high-definition television) standard. In one method in which the light is time-divided, white light from a light source is passed through a color wheel to generate time-divided primary color light components, which illuminate a spatial optical modulator, to generate images of respective colors.

In a method in which the three primary color light components are time-divided and used for illumination, the light components other than the primary color light component which is being used are not utilized (are reflected or absorbed to cause a loss), so that the light utilization efficiency is low. Improvements in this respect have been desired.

Figure 8:
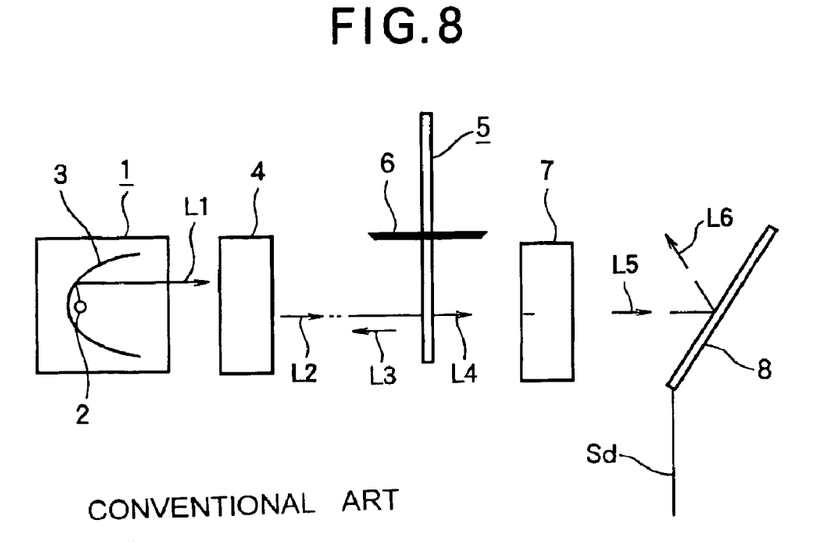
FIG. 8 is a diagram showing the configuration of a conventional image projection apparatus.

FIG. 8 shows the configuration of a conventional image projection apparatus. Reference numeral 1 denotes a white light source, which includes a lamp 2 and a reflector 3. Reference numeral 4 denotes a first optical means for converging the light emitted by the light source 1. Reference numeral 5 denotes a color wheel formed of color filters of three primary colors. Reference numeral 6 denotes an axis of rotation of the color wheel. Reference numeral 7 denotes a second optical means for converting the light having passed through the color wheel 5 into light which illuminates the spatial optical modulator 8. Reference mark Sd denotes a signal for driving the spatial optical modulator 8. Reference mark L1 denotes light emitted from the light source 1. Reference mark L2 denotes light incident on the color wheel 5. Reference mark L3 denotes light reflected from the color wheel 5. Reference mark L4 denotes light having passed through the color wheel 5. Reference mark L5 denotes light illuminating the spatial optical modulator. Reference mark L6 denotes light having been modulated by the spatial optical modulator. The light L6 is incident on a projection lens (not shown), and is projected on an object (not shown). The object may be a projection screen, photosensitive film, or the like.

Figure 9:
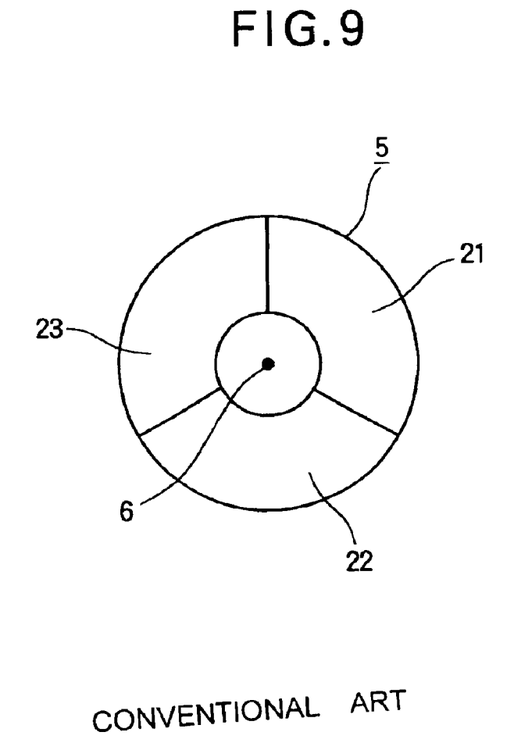
FIG. 9 is a diagram showing an example of disposition of the color filters in a color wheel in the conventional image projection apparatus.
Figure 10:
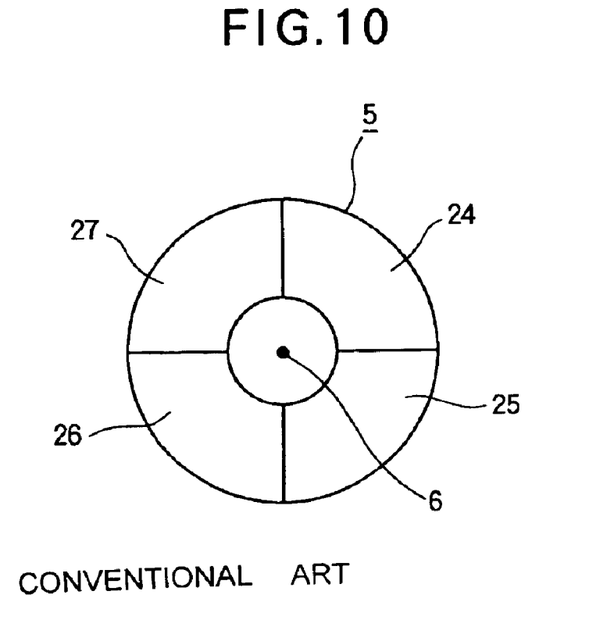
FIG. 10 is a diagram showing another example of disposition of the color filters in a color wheel in the conventional image projection apparatus.

FIG. 9 and FIG. 10 show the configuration of the color wheel in a conventional image projection apparatus shown for example in Japanese Patent Kokai Publication No. H5-273673. FIG. 9 shows a color wheel, and reference numerals 21, 22 and 23 denote color filters passing red light, green light and blue light, respectively. The angle occupied by each of the color filters 21, 22 and 23 is 120 degrees. FIG. 10 shows a color wheel including a transparent plate provided in addition to the color filters of the three primary colors, for the purpose of increasing the brightness of the illuminating light. Reference numerals 24, 25 and 26 denote color filters for passing the red light, green light and blue light, respectively. Reference numeral 27 denotes a transparent plate. The angle occupied by each of the filters 24, 25 and 26, and the transparent plate 27 is 90 degrees.

In FIG. 8, the lamp 2 generates light containing red, green and blue light spectra, and the reflector 3 re-directs the light emitted by the lamp 2 toward the first optical means 4. The light L1 is thereby emitted from the light source 1. The first optical means 4 receives the light L1 emitted from the light source 1, and converges the light towards the color wheel. The converged light L2 hits the color filters of the color wheel.

When the color wheel is configured as shown in FIG. 9, and the color wheel rotates 60 revolutions per second, the light L2 is incident at a fixed position, so that the light passing through the color wheel is switched in the sequence of red, green and blue, depending on the rotary positions of the color filters 21, 22 and 23, and this process is repeated 60 times every second. The light having passed through the color filters 21, 22 and 23 is converted by the second optical means 7 into substantially collimated light L5, and illuminates the spatial light modulator 8. The spatial light modulator 8 is driven by the drive signal Sd and modulates the intensity of the light such that the each of the primary colors form a corresponding image, and the light L6 is thereby emitted. The light L6 consists of the light components of the three primary colors emitted sequentially, so that the light components are additively mixed to project images of any desired color. The light components which do not pass through the color filters 21, 22 and 23 are absorbed or reflected, and are not utilized for the light projection. As a result, on average, one third of the light from the light source is utilized for the light projection, while two thirds are not utilized.

When the color wheel is of the configuration shown in FIG. 10, the light L4 repeats changing in the order of red, green, blue and white, 60 times a second. When white light is projected, the luminance is increased, but as the angles occupied by the color filters are reduced, the image becomes dark in the case of highly saturated colors, and the vividness of the colors is lost.

Figure 11:
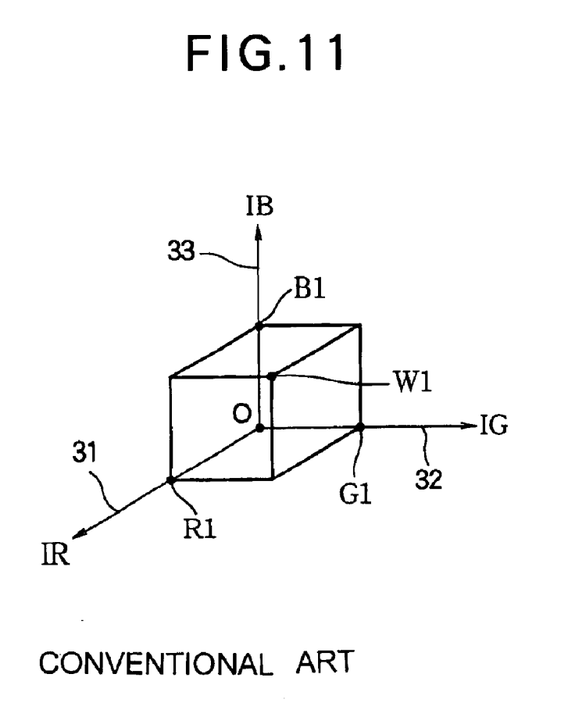
FIG. 11 is a drawing showing the range of intensity of light which can be used for illumination in the conventional image projection apparatus, in a space defined by axes representing the average illumination intensities of the three primary colors, in a situation where the filter arrangement is as shown in FIG. 9.

FIG. 11 is a three-dimensional representation of the temporal average of the luminous flux intensity (temporal average luminous flux intensity) of the light L5 illuminating the spatial light modulator 8 in the conventional image projection apparatus. In the figure, reference numerals 31 to 33 respectively denote coordinate axes representing the temporal average luminous flux intensities IR, IG and IB of the primary colors of red, green and blue. Points R1, G1 and B1 respectively represent the temporal average luminous flux intensities of the primary colors of red, green and blue. Point W1 represents the temporal average luminous flux intensity of the light resulting from the combination of the lights of the three primary colors. The inside of a rectangular parallelopiped having its vertexes at the origin O, the points R1, G1, B1, W1, etc., represent the range which can be used for forming projected images by modulation of the intensity of the light L6 by means of the spatial light modulator 8. The larger the rectangular parallelopiped is, the brighter are the images formed by the light projection apparatus, and the wider is the range of expression. The image with a higher luminance can be projected more brightly if the point W1 is farther from the origin O. The image with a higher saturation can be projected more brightly if the points R1, G1 and B1 are farther from the origin.

Figure 12:
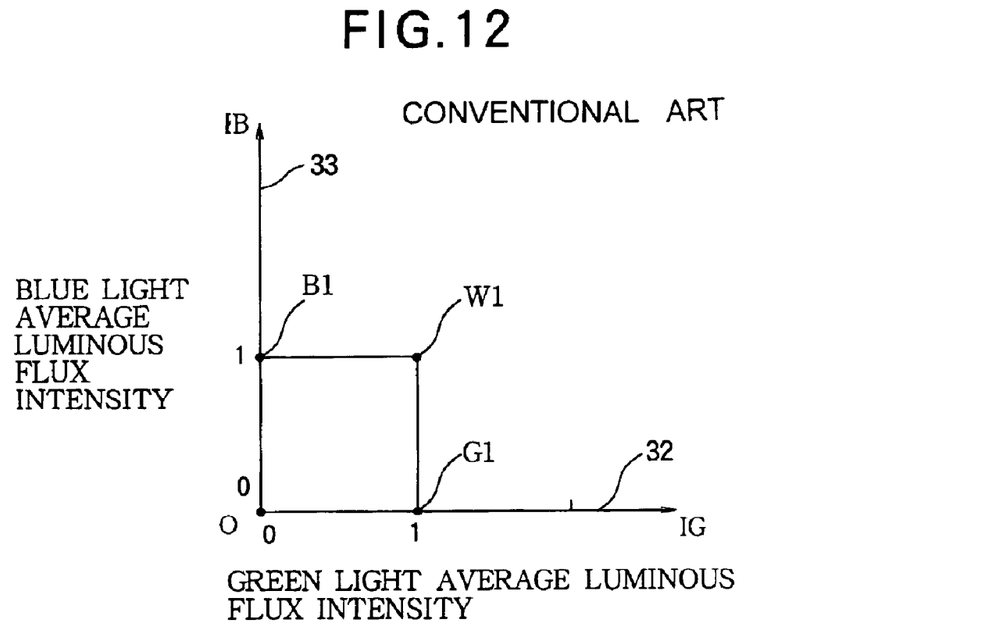
FIG. 12 is a drawing showing the range of intensity of light which can be used for illumination in the conventional image projection apparatus, on a plane defined by axes representing the average illumination intensities of the green and blue, in a situation where the filter arrangement is as shown in FIG. 9.

FIG. 12 is a plan view showing projection of the various points in FIG. 11 onto a plane containing the IG axis and the IB axis. The scales on the axes are arbitrary, but for the purpose of the following comparison, the IG axis coordinate value of the point G1, and the IB axis coordinate value of the point B1 are assumed to be "1." That is the temporal average luminous flux intensity of each of the three primary colors obtained when the color filters occupying 120 degrees are used is "1."

Figure 13:
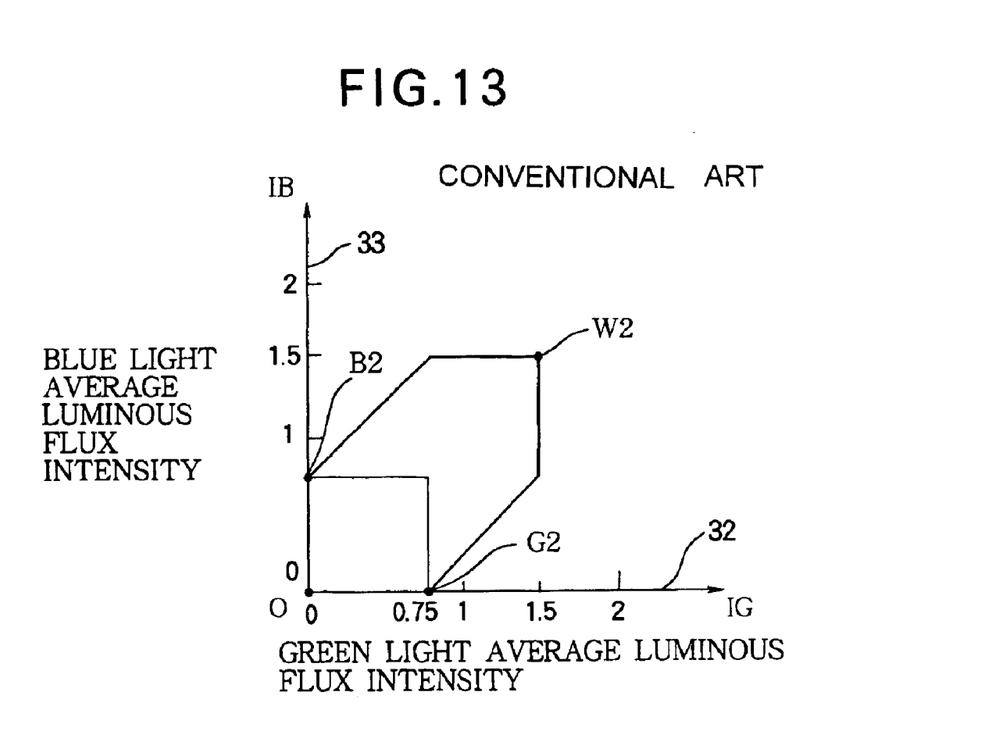
FIG. 13 is a drawing showing the range of intensity of light which can be used for illumination in the conventional image projection apparatus, on a plane defined by axes representing the average illumination intensities of the green and blue, in a situation where the filter arrangement is as shown in FIG. 10.

FIG. 13 is a plan view showing a projection on a plane defined by the IG axis and IB axis, of the temporal average luminous flux intensity of the light L5 illuminating the spatial optical modulator 8 in the conventional image projection apparatus, in a situation in which the color wheel is of the configuration shown in FIG. 10. The points G2 and B2 represent the temporal average luminous flux intensities of the green and blue primaries, and the point W2 represents the temporal average luminous flux intensity of the light combining the three primary colors. In the color wheel shown in FIG. 10, the angle occupied by each color filter is 90 degrees, so that the IG axis coordinate value of point G2 is 0.75, since 90/120=0.75. Similarly, the IB coordinate axis value of the point B2 is 0.75. The transparent plate passes the light of the three primary colors concurrently, and extends over 90 degrees, so that the luminous flux is increased by 0.75 for each color. For instance, if the white light is added to the light representing the three primary colors, the light intensity is as indicated by W2 in FIG. 13, and this will be the maximum luminance. The range in which the illumination with light is possible extends over the hexagon defined by the origin O, and the points G2, W2 and B2. The ranges on other projected planes are similar. If the coordinate of a point is represented by (IR axis coordinate, IG axis coordinate, IB axis coordinate), the point W2 in FIG. 13 is (1.5, 1.5, 1.5), and is 1.5 times stronger than the coordinate (1, 1, 1) of the point W1 shown in FIG. 12. The coordinate of the point G2 in FIG. 13 is (0, 0.75, 0), so that the green illumination light is 75% of the coordinate (0, 1, 0) of the point G1 in FIG. 12. Accordingly, the image with a high saturation will have the brightness is reduced to 75%.

In the conventional method of increasing the luminance using the color wheel in FIG. 9, it is important that the the proportions between the angles occupied by the color filters and the transparent plate forming the color wheel be so set as to fit the image to be projected. However, it is usually not possible to predict the colors and the saturation of the image projected, so that it is not possible to know the optimum proportion. Moreover, there is a trade-off relation between the luminance of the white peak and saturation of the color. Accordingly, whatever the proportion is determined to be, there are images which will be projected dark.

SUMMARY OF THE INVENTION

The invention is to eliminate the problems discussed above. Its object is to increase the brightness of almost all the projected images, in an image projection apparatus having a single spatial optical modulator, compared with the conventional image projection apparatus, Another object is to provide an image projection apparatus with a high performance, and of a low cost.

According to a first aspect of the invention, there is provided an image projection apparatus comprising:

a light source for emitting light containing different color components;

a sequential color selecting means for sequentially passing different color components of the light from said light source;

means for generating white light;

a spatial light modulator;

means for guiding the light having passed through the sequential color selecting means and said white light to said spatial light modulator; and means for adjusting the temporal average intensity of the white light;

wherein said spatial light modulator spatialy modulates the light having passed through the sequential color selecting means and the white light with its temporal average intensity having been adjusted, to generate image light.

With the above arrangement, not only the light having passed through the sequential color selecting means, but also the white light is guided to the spatial light modulator, so that the luminance of the projected image can be increased. Moreover, by adjusting the temporal average intensity of the white light, the luminance and the saturation of the image can be adjusted depending on the features of the image. For instance, in the case of an image with a smaller saturation, the temporal average intensity of the white light is increased to obtain a brighter image. In the case of an image with a greater saturation, the temporal average intensity of the white light can be reduced so as not to lose the vividness of the colors of the image.

Said means for adjusting the temporal average intensity of the white light may include a liquid crystal shutter.

With the above arrangement, the means for adjusting the temporal average intensity of the white light can be realized by a member which is less expensive and consumes less power.

Said means for generating the white light may include means for combining light the reflected at the sequential color selecting means and the light having passed through the sequential color selecting means.

With the above arrangement, the light reflected at the sequential color selecting means is used to generate the white light, so that the light from the light source can be utilized efficiently.

Said means for adjusting the temporal average intensity of the white light may be configured to adjust the light reflected at the sequential color selecting means, to thereby adjust the temporal average intensity of the white light indirectly.

With the above arrangement, the temporal average intensity of the white light can be adjusted by a simple configuration.

It may be so configured that said sequential color selecting means has a plurality of color filters, which are formed of dichroic filters, and the light reflected at an incident surface of the sequential color selecting means is guided to an exit surface of the sequential color selecting means so that it is combined with the light having passed through the sequential color selecting means.

With the above arrangement, the color filters forming the sequential color selecting means are made of dichroic filters, so that the light of wavelengths other than those of the passing light can be efficiently reflected, and can be combined efficiently at the exit surface.

It may be so configured that said sequential color selecting means includes a plate member held rotatably about an axis of ration, said plate member is divided into three or more regions by lines extending in radial directions from the axis of rotation, and at least three of the regions have color filters of three primary colors of red, green and blue.

With the above arrangement, full color light projection is possible. Moreover, by adding all of the three primary colors, white light can be obtained and projection of monochromatic images can be achieved.

Said spatial light modulator may comprise a digital micromirror device.

With the above arrangement, it is possible to carry out pulse-width modulation at a high speed, and even if the time for illuminating the spatial light modulator with any of the light is shortened due to the adjustment of the temporal average intensity of each color, the unit pulse-width can be reduced to achieve pulse-width modulation with a sufficient number of gray scale levels.

A controller may be additionally provided for adjusting the temporal average intensity depending on the contents of an image signal representing the image to be projected.

With the above arrangement, the luminance, and saturation can be automatically adjusted depending on the contents of the image signal.

According to a second aspect of the invention, there is provided an image projection apparatus comprising:

a light source for emitting light containing different color components;

a sequential color selecting means for sequentially passing different color components of the light from said light source;

a spatial light modulator;

means for guiding the light having passed through the sequential color selecting means and the light reflected at said sequential color selecting means to said spatial light modulator; and adjusting means which can reduce the temporal average intensity of the reflected light;

wherein said spatial light modulator spatially modulates the light having passed through the sequential color selecting means and the reflected light with its temporal average intensity having been adjusted, to generate image light.

With the above arrangement, not only the light having passed through the sequential color selecting means, but also the reflected light are guided to the spatial light modulator, so that the luminance of the projected image can be increased. Moreover, because the light reflected at the sequential color selecting means is used to generate the white light, the light from the light source can be utilized efficiently.

The rate of reduction by the adjusting means may be variable.

With the above arrangement, the rate of reduction at the adjusting means can be varied to vary the luminance and the saturation depending on the features of the image. For instance, in the case of an image with a smaller saturation, the temporal average intensity of the white light is increased to obtain a brighter image. In the case of an image with a greater saturation, the temporal average intensity of the white light can be reduced so as not to lose the vividness of the colors of the image.

DETAILED DESCRIPTION OF THE PREFERRED EMBODIMENTS

Embodiments of the invention will now be described with reference to the drawings.

Embodiment 1.

Figure 1:
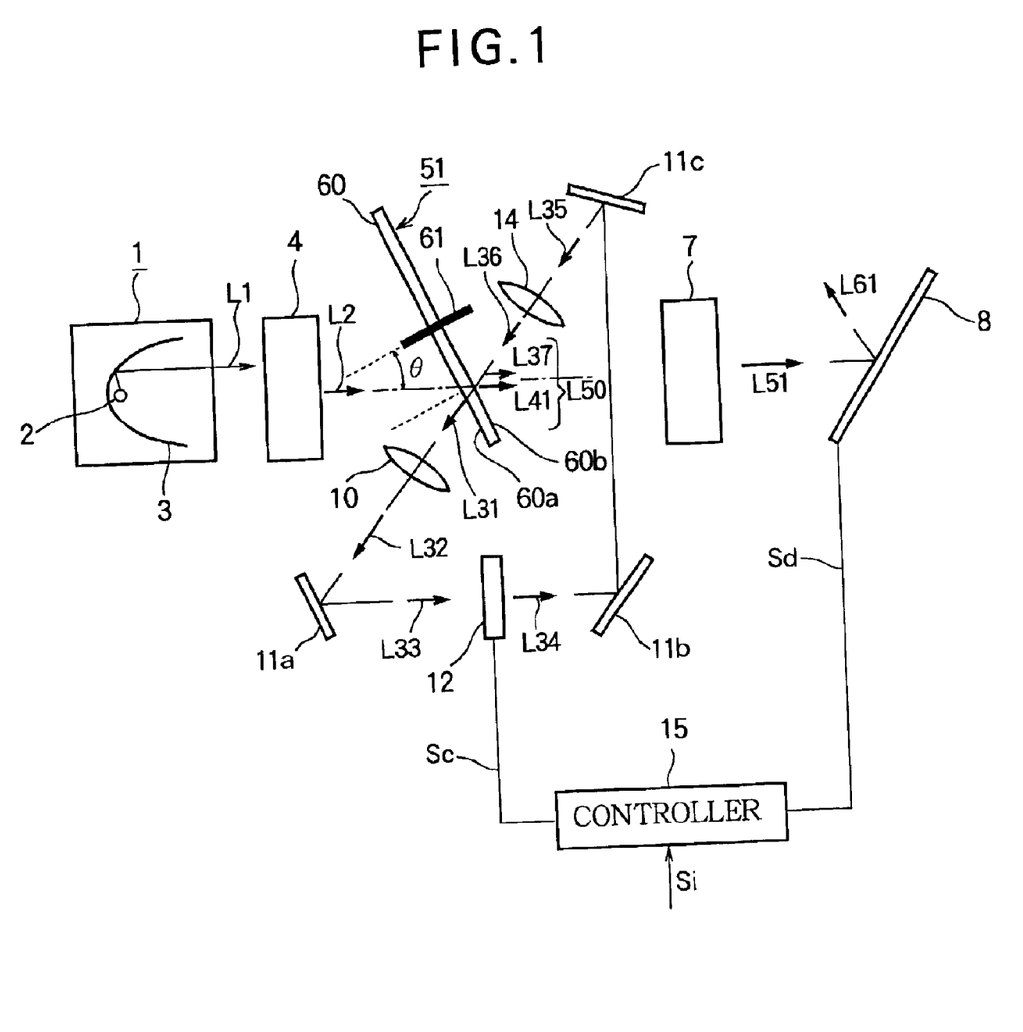
FIG. 1 is a drawing showing the configuration of the image projection apparatus of Embodiment 1 of this invention.

FIG. 1 is a diagram showing the configuration of an image projection apparatus of an embodiment of the invention. Reference numeral 1 denotes a light source emitting light, such as white light, containing different color components. The light source 1 includes a lamp 2 and a reflector 3, and emits light L1. Reference numeral 4 denotes a first optical means for converging light L1 emitted from the light source 1 and emits light L2.

Reference numeral 51 denotes a rotary sequential color selecting means (color wheel) having a disk-shaped combination filter 60 having an incident surface 60a, and an exit surface 60b, and a shaft 61 extending normal to the incident and exit surfaces 60a and 60b. The shaft 61 is inclined by an angle θ with respect to the direction in which the light L2 from the first optical means 4 travels. Of the light L2, the light component having passed through the color wheel 51 is indicated by L41, while the reflected light component is indicated by L31. The angle θ of inclination is so set that the incident light L2 and the reflected light L31 can be separated.

Reference numeral 10 denotes a third optical means for converting the reflected light L31 into a collimated light with a cross section of a predetermined size. Reference numerals 11a to 11c denote light guiding means formed, for example, of reflecting mirrors. Reference numeral 12 denotes a light shutter formed of a liquid crystal. Reference mark Sc denotes a signal for controlling the light shutter 12. Reference mark L33 denote a light incident on the light shutter 12. Reference mark L34 denotes light having passed through the light shutter 12. Reference numeral 14 denotes a fourth optical means for converting the light having passed through the light shutter 12 into collimated light, and configured such that the collimated light is incident on the part of the color filters of the color wheel 51 (the part of the exit surface 60b) at which the passing light exits. Reference mark L35 denotes light incident on the fourth optical means 14. Reference mark L36 denotes light emitted by the fourth optical means 14. Reference mark L37 denotes light resulting from the reflection of the light L36 at the exit surface 60b.

Reference numeral 7 denotes a second optical means for converging the light having passed through the color wheel 51, into the light illuminating a spatial light modulator 8 in a succeeding stage. The spatial light modulator 8 is formed of a digital micromirror device. Reference mark Sd denotes a signal for driving the spatial light modulator 8. Reference numeral 15 denotes a controller receiving a image signal Si, generating the control signal Sc and the drive signal Sd, and causing synchronization between the rotation of the color wheel 51, and the operation of the light shutter 12 and the spatial light modulator 8.

Reference mark L51 denotes light formed by addition (synthesis or superimposition) of the light L41 and the light L37, and illuminating the spatial light modulator 8. Reference mark L61 denotes light modulated by and emitted from the spatial light modulator 8.

As described above, the color wheel 51 includes the disk-shaped combination filter 60. The disk-shaped combination filter 60 is divided by three lines extending in the radial directions and apart from each other by 120 degrees, into three regions, and has, at the respective regions, color filters of the three primary colors formed of dichroic filters. Accordingly, each of the color filters occupies 120 degrees of the combination filter. Each dichroic filter passes just one color of the three primary colors, and reflects the remaining colors.

The light L2 converged by the first optical means 4 is incident on the color filters of the color wheel 51, and part of the incident light (the color component selected by the color filter on which the light is incident) passes through the color filter, and travels straightly as the light L41 and enters the second optical means 7. The remaining part of the light L2 (most of the color components not selected by the color filter on which the light L2 is incident) is reflected in a direction different by the angle 2×θ from the direction in which the light is incident, and enters the third optical means 10 where it is converted into the collimated light L32, which is guided by the light guiding means 11a, and enters, as the light L33, into the light shutter 12.

In accordance with the control signal Sc, the light shutter 12 controls the proportion of the light L33 which is passed. The passing light L34 is guided by the light guiding means 11b and 11c, to become the light L35. By controlling the proportion by which the light L33 passes, the temporal average intensity of the light L35 is adjusted. The light L35 enters the fourth optical means 14, and is converted into the collimated light L36. The light L36 is incident on the part (of the exit surface) at which the light L41 having passed through the color wheel 51 exits, in the direction identical to the direction in which the light L31 travels, and is reflected in the direction identical to the direction of the light L2, to become the light L37 and is synthesized or combined with the light L41 which is the component of the light L2 that has passed through the color filter. The combined light formed by synthesis or combination of the light L37 and the light L41 is identified as light L50. The light L50 passes the second optical means 7 to become the light L51.

When the light L41 is red light, the light L31 contains the green light component and the blue light component. When the light shutter 12 is in a state passing light, the green light component and the blue light component are passed as the light L37, and is combined with the light L41, so that the light L51 illuminating the spatial light modulator 8 is white light.

Figure 2A:
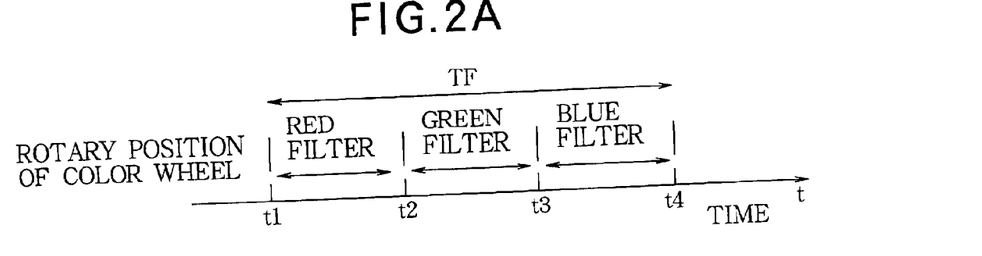
FIG. 2A to FIG. 2E are charts showing the timing of rotation of the color wheel, the timing of the opening/closing of the light shutter, and the timing of the illumination of the spatial optical modulator in Embodiment 1 of the invention.
Figure 2B:
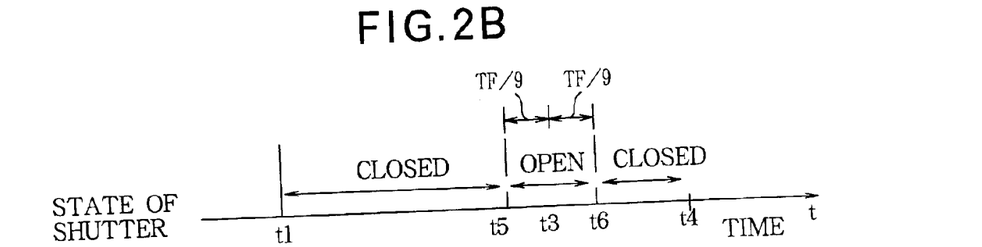
Figure 2C:
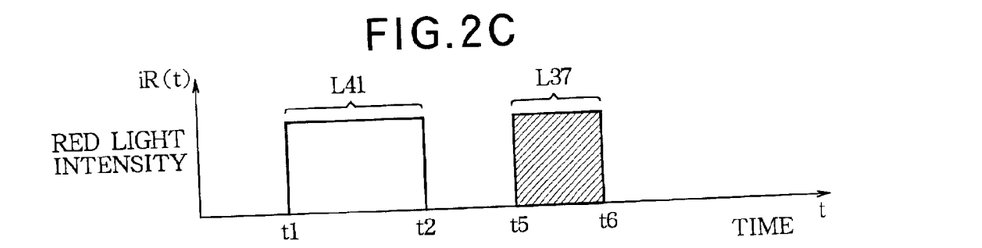
Figure 2D:
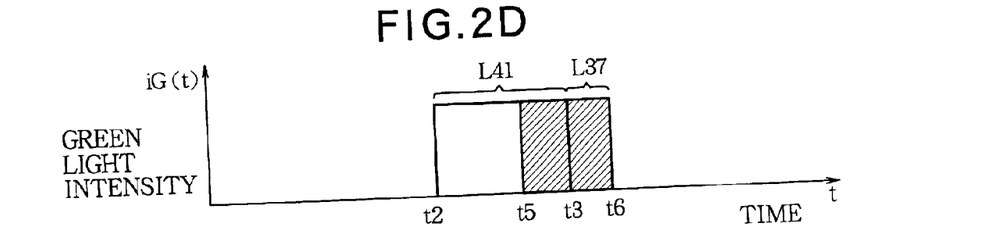
Figure 2E:
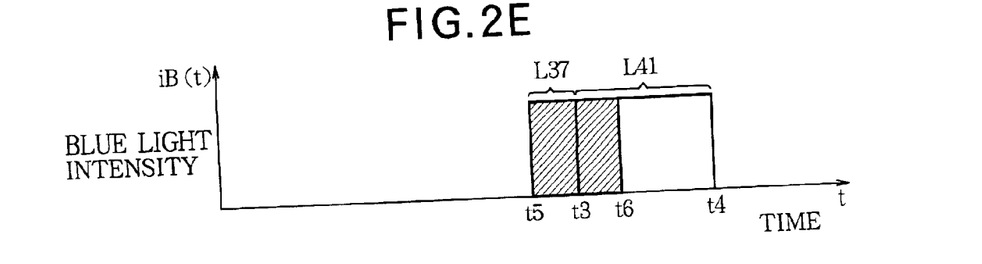

FIG. 2A is a diagram showing the movement of each filter during rotation of the color filter 51, i.e., which of the red, green and blue filters is at the position at which the light L2 is incident, in other words, which of the light components is passing through the filter. FIG. 2B is a diagram showing the opening and closing timings of the light shutter 12. FIG. 2C to FIG. 2E are timing charts showing the instantaneous values iR(t), iG(t) and iB(t) of intensity of the red, green and blue light components.

In FIG. 2A, during the period of from time t1 to t2, the light L2 is incident on the red filter (the red filter is at the position where the light L2 is incident). During the period of from time t2 to t3, the light L2 is incident on the green filter. During the period of from time t3 to t4, the light L2 is incident on the blue filter. The color wheel 51 makes one revolution over the time from time t1 to t4. The rotation time TF of the color wheel 51 is made less than 1/60 sec. such that the flicker is not conspicuous.

In FIG. 2B, during the period of from t1 to t5, the light shutter 12 is closed; during the period of from t5 to t6, the light shutter 12 is open; and during the period of from t6 to t4, the light shutter 12 is closed. The timing t5 is at the temporal position of 2/3 of the period of from t2 to t3, from t2. The timing t6 is at the temporal position of 1/3 of the period of from t3 to t4, from t3. In the description of this embodiment, it is assumed that when the light shutter 12 is open, it is fully open, and the incident light is made to exit without attenuation. During the period of from t5 to t3, of the time period (t5 to t6) in which the light shutter 12 is open, the green filter is at the incident position of the light L2, so that the red and blue light components are reflected by the filter and passed through the light shutter 12 and guided as the reflected light L37 to the spatial light modulator 8. During the period of from t3 to t6, the blue filter is at the incident position of the light L2, so that the red and green light components are reflected by the filter, and passed through the light shutter 12, and are guided as the reflected light L37 to the spatial light modulator 8.

As shown in FIG. 2C, the red light component is incident on the spatial light modulator 8 as the passing light L41 during the period of from t1 to t2, and as the reflected light L37 during the period of from t5 to t6. As shown in FIG. 2D, the green light component is incident on the spatial light modulator 8 as the passing light L41 during the period of from t2 to t3, and as the reflected light L37 during the period of from t3 to t6. As shown in FIG. 2E, the blue light component is incident on the spatial light modulator 8 as the reflected light L37 during the period of from t5 to t3, and as the passing light L41 during the period of from t3 to t4.

As was described, it is assumed that when the light shutter 12 is open, there is no attenuation, so that during the period (of from t5 to t6) when the light shutter 12 is open, the combination of the passing light L41 and the reflected light L37 results in white light. Accordingly, the period in which only the green light is incident on the spatial light modulator 8 is from t2 to t5, and the period in which only the blue light is incident on the spatial light modulator 8 is from t6 to t4.

Thus, the light of three primary colors and the white light are incident on the spatial light modulator 8 sequentially (in the order of red, green, white and blue, in the above example). Accordingly, the configuration of this embodiment operating in the above manner is equivalent to the conventional apparatus of FIG. 10, so configured that the transparent plate is positioned at the incident position and the white light is incident on the spatial light modulator 8 for the period of t5 to t6 (in which the light shutter 12 is open). By increasing the proportion of the white light the luminance can be enhanced, in the same manner as was described in connection with the conventional apparatus.

The maximum luminance of each of red, green and blue is determined by the length of the time for which the light component of that color alone is incident on the spatial light modulator 8, i.e., the length of time for which the light component of that color is incident on the spatial light modulator 8 minus the length of time for which the white light is incident on the spatial light modulator 8. In the example shown in FIG. 2C to FIG. 2E, the maximum luminance of each color is determined by the length of time from t1 to t2 for red, the length of time from t2 to t5 for green, and the length of time from t6 to t4 for blue.

The spatial light modulator 8 is driven by the signal corresponding to the color of light which is being incident. That is, when the light of red only is incident, the spatial light modulator 8 is driven by the signal for red. When the light of green only is incident, the spatial light modulator 8 is driven by the signal for green. When the light of blue only is incident, the spatial light modulator 8 is driven by the signal for blue. When the white light is incident, the spatial light modulator 8 is driven by the luminance signal.

Spatial light modulators which can operate at a speed of 10 microseconds are available. If the time for illumination by each color is in the order of 2 milliseconds, it is possible to achieve pulse-width modulation of 200 gray scale levels, so that the light projection with a sufficient number of gray scale levels can be achieved. In the example illustrated, each of the period of from t1 to t2 for red, the period of from t2 to t5 for green, the period of from t6 to t4, and the period of from t5 to t6 for white is divided into the number of gray scale levels of the pulse-width modulation, and control over the tone is thereby achieved.

The light shutter 12 may be configured of a polarization converting means, a liquid crystal, and an analyzing means, arranged in this order from the light incident side. The polarization converting means should preferably be of such a configuration that the the component of the incident light polarized in a first direction is passed without alteration, and the component of the incident light polarized in a second direction normal to the first direction is converted into light polarized in the first direction, and the light having its polarization direction converted is then emitted.

The time t5 and the time t6 may be controlled by the timing of generation of the control signal Sc, and may be varied depending on the image being projected. For instance, in the case of a moving picture, the adjustment of the timing of the control signal Sc can be made for each field. This control is made by the controller 15.

The example shown in FIG. 2A to FIG. 2E is suitable for a situation in which the saturation of red is high, and saturation of other colors is low, so that the entirety of the red light during the period of from t1 to t2 is used for projection with red, and the period of from t5 to t6 which is a part of the period for illumination by green and blue is replaced by the illumination by white light, by opening the light shutter 12.

In the example shown in FIG. 2A to FIG. 2E, the timing at which the white light is generated is just once in one revolution of the color wheel. The invention is not limited to this arrangement, but the white light may be generated more than once in one revolution of the color wheel, and the length of time for which the white light is generated can be set in various ways.

When the image is a monochromatic image, the light shutter 12 may be kept open. In that case, the brightness of the projection will be three times that of an apparatus which does not use white light.

Figure 3:
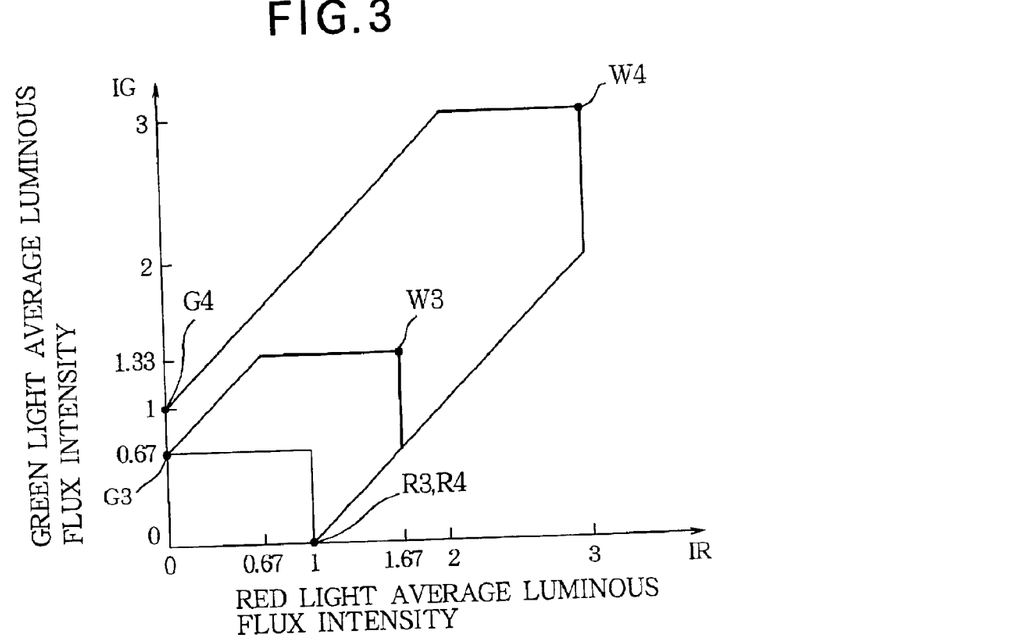
FIG. 3 is a drawing showing the range of intensity of light which can be used for illumination, on a plane defined by axes representing the average illumination intensities of red and green primaries according to Embodiment 1 of the invention.
Figure 4:
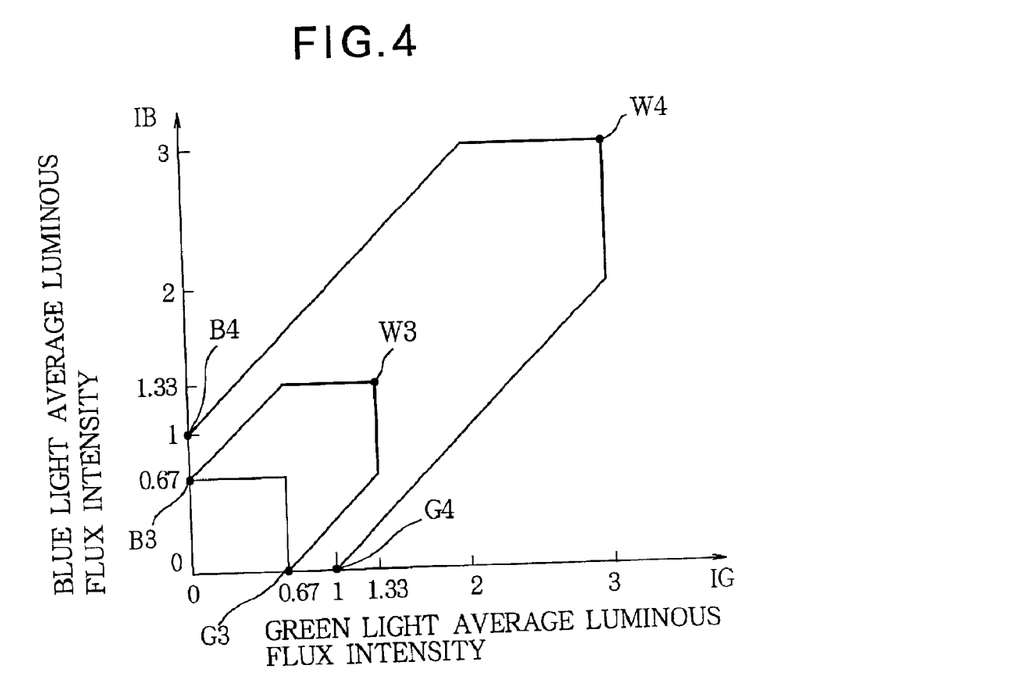
FIG. 4 is a drawing showing the range of intensity of light which can be used for illumination, on a plane defined by axes representing the average illumination intensities of green and blue primaries according to Embodiment 1 of the invention.

FIG. 3 and FIG. 4 show the range of variation of the temporal average luminous flux intensity of the light L51 illuminating the spatial light modulator 8 in the image projection apparatus of the embodiment of the present invention. FIG. 3 shows the projection of the range onto the plane defined by the red light IR axis, and the green light IG axis. FIG. 4 shows the projection of the range onto the plane defined by the green light IG axis, and the blue light IB axis. When the light shutter 12 is open for the period shown in FIG. 2B, the illumination intensities of the red light, green light, and blue light are represented by point R3 (1, 0, 0), point G3 (0, 0.67, 0), and point B3 (0, 0, 0.67), respectively. The maximum luminance, obtained by addition of the white light, is at point W3 (1.67, 1.33, 1.33).

By varying the timings at which the light shutter 12 is opened and closed, the points R3, G3, B3 and W3 can be moved, but their maximum values are R4 (1, 0, 0), G4 (0, 1, 0), B4 (0, 0, 1), and W (3, 3, 3), respectively. At the point W4, all the coordinate values are "3," and projection with a brightness three times that of a conventional apparatus can be made if the image is a monochromatic image, as described above. If the saturation is high with respect to all the colors, illumination by white light is not made. In the case of an image of red only, the period of illumination by green light and blue light can be removed.

By the adjustment of the timings t5 and t6, or, in more general terms, the period for which the white light is incident on the spatial light modulator 8, the luminance and saturation of the image can be adjusted. Accordingly, the luminance and saturation of the image can be adjusted depending on the feature of the image. For instance, in the case of an image with a small saturation, the temporal average intensity of the white light can be increased to increase the brightness of the image. In the case of an image with a high saturation, the temporal average intensity of the white light is decreased so as not to lose the vividness of the colors of the image.

In the above embodiment, the light reflected at the color wheel 51 and the light having passed through the color wheel 51 are combined to form white light, so that the light from the light source can be utilized efficiently. Moreover, by adjusting the timings at which the light shutter 12 is opened and closed, the length of time for which the light reflected at the color wheel 51 and the light having passed through the color wheel 51 are combined to produce white light is adjusted, to thereby indirectly adjust the temporal average intensity of the white light and the intensity of the light of each color. Accordingly, the white light and light of each color can be adjusted with a simile configuration and efficiently.

Moreover, because the filter of each color is formed of a dichroic filter, the light is reflected efficiently, and the light from the light source can be utilized more efficiently.

Furthermore, the light reflected at the incident surface of the color filter is combined at the exit surface of the same color filter, so that the overall configuration of the apparatus is simple, and the utilization rate of light is high.

In addition, the light shutter 12 is formed of a liquid crystal shutter, the means for adjusting the temporal average intensity of white light can be realized by members which are of a low cost, and consume less power.

Embodiment 2.

In Embodiment 1, the period for which the light shutter 12 is open is adjusted, in order to adjust the temporal average intensity of light. Alternatively, the proportion by which the light passes, of the light incident on the light shutter 12, maybe adjusted. The illustration of such a configuration is identical to that of FIG. 1. However, the operation of the light shutter 12 is different.

Figure 5A:
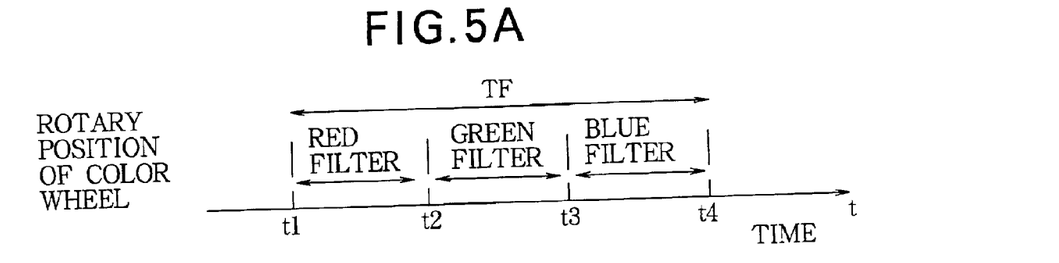
FIG. 5A to FIG. 5E are charts showing the timing of rotation of the color wheel, the timing of the opening/closing of the light shutter, and the timing of the illumination of the spatial optical modulator in Embodiment 2 of the invention.
Figure 5B:
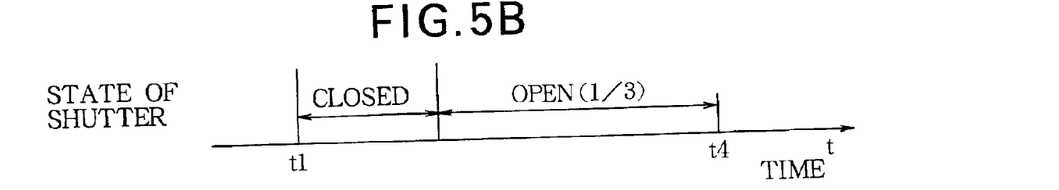

That is, in Embodiment 1, when the light shutter 12 is open, the intensity of the light emitted from the light shutter 12 is identical to that the incident light. In Embodiment 2, a predetermined proportion of the incident light will be the emitted light. An example is shown in FIG. 5. In the example shown in FIG. 5, the opening (overall transmittance) P of the light shutter 12 is ⅓, throughout the period for which the color wheel 51 passes the green light and the blue light. That is one third (or 33.3%) of the incident light will be the emitted light.

Figure 5C:
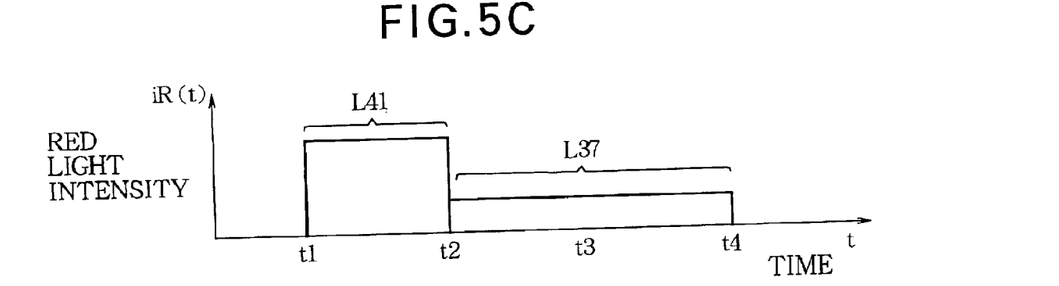
Figure 5D:
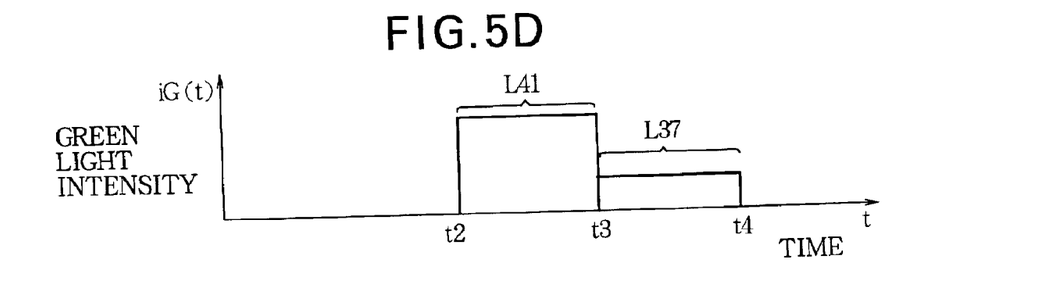
Figure 5E:
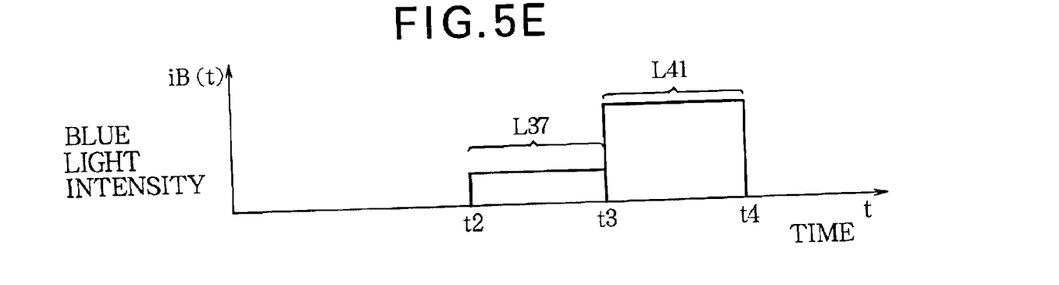

The light emitted from the light shutter 12 is combined at the exit surface 60b of the color wheel 51, with the light having passed through the color wheel 51. Accordingly, the light incident on the spatial optical modulator 8 is as shown in FIG. 5C to FIG. 5E. That is, the red light is incident with an intensity of 100% (This takes the intensity of the light incident on the color wheel 51, as a reference. This applies to the subsequent description.) for the period of from t1 to t2, and 33.3% for the period of from t2 to t4. The green light is incident on the spatial optical modulator 8 with an intensity of 100% for the period of from t2 to t3, and 33.3% for the period of from t3 to t4. The blue light is incident on the spatial optical modulator 8 with an intensity of 33.3% for the period of from t2 to t3, and 100% for the period of from t3 to t4.

Accordingly, the temporal average intensity of the red light will be: 1+0.333×2=1.67;

the temporal average intensity of the green light will be: 1+0.333×1=1.33; and the temporal average intensity of the blue light will be: 1+0.333×1=1.33.

The result is equivalent to that of the example described in connection with Embodiment 1 in which the light shutter 12 is fully open for one third of the period of each of the periods of green and blue.

Figure 6A:
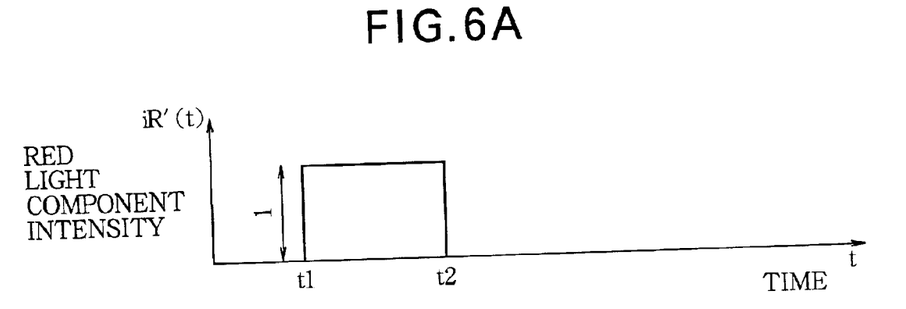
FIG. 6A to FIG. 6D are charts showing the result of division of the light incident on the spatial optical modulator into the white light and the light (component) of each color according to Embodiment 2 of the invention.
Figure 6B:
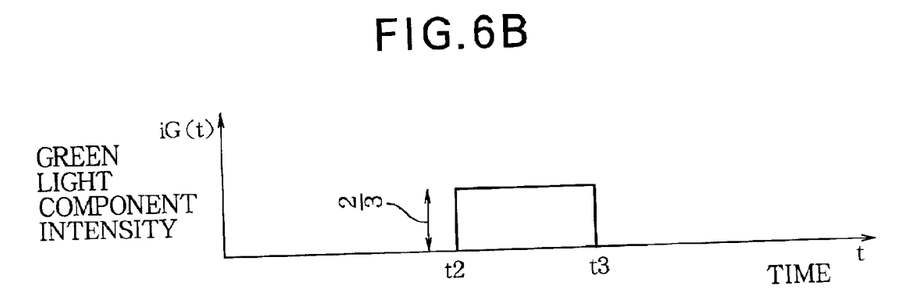
Figure 6C:
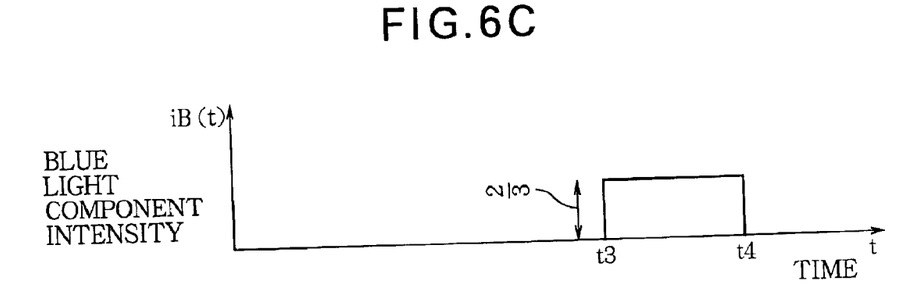
Figure 6D:
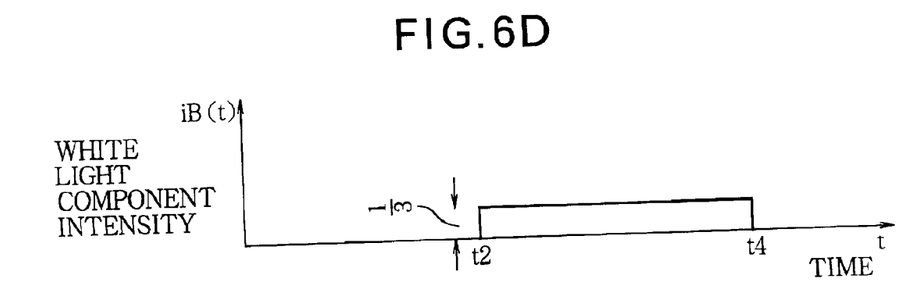

Because the intensity of light incident on the spatial optical modulator 8 for the period of from t2 to t3 is 33.3% with regard to the red light and the blue light, and 100% with regard to the green light, it can be regarded that P=33.3% of the green light forms white light together with the red and blue light, while the remainder (1−P)=66.7% reaches the spatial optical modulator 8 as green light. Similarly, because the intensity of light incident on the spatial optical modulator 8 for the period of from t3 to t4 is 33.3% with regard to the red light and the green light, and 100% with regard to the blue light, it can be regarded that P=33.3% of the blue light forms white light together with the red and green light, while the remainder (1−P)=66.7% reaches the spatial optical modulator 8 as blue light. FIG. 6A to FIG. 6A to FIG. 6D shows division of each of the three primary colors into the component forming the white light iW'(t) and the remaining component iR'(t), iG'(t) and iB'(t) (called the red light component, the green light component, and the blue light component, respectively).

As illustrated, during the period of from t2 to t4, the white light and green light component and the blue light component are superimposed, so that the spatial optical modulator 8 is driven by a combination of the luminance signal and the signals of the respective colors superimposed with each other. For instance, from t2 to t3, the white light and the green light component are superimposed, so that the spatial optical modulator 8 is driven by a signal obtained by superimposing the luminance signal and the green light signal. From t3 to t4, the white light and the blue light component are superimposed, so that the spatial optical modulator 8 is driven by a signal obtained by superimposing the luminance signal and the blue light signal. The control and supply of the drive signal for this purpose are performed by the controller 15.

The light shutter 12 used for adjusting the temporal average intensity of light need not be one which varies the optical transmittance uniformly throughout the plane. For instance, a shutter in which its plane is divided into a plurality of regions, and the opening/closing of each region can be controlled independently, may be used in combination with a means (spatial averaging means) for increasing the uniformity of the light throughout the plaen. Such a spatial averaging means may already be included in the optical means 7 for other purposes, e.g., for compensating the non-uniformity of the light from the light source, and in that case the same means may be used to increase the uniformity throughout the plane of the light having passed through the light shutter 12.

Thus, the uniformity of the light transmittance throughout the area in which the light passes is not necessarily important, so that various types of liquid crystal devices can be used. Among the various types, ferroelectric liquid crystal devices can operate at a high speed of several tens of microseconds, and are advantageous in being able to shorten the switching times.

Moreover, the control over the opening/closing (as explained with reference to FIG. 2) and control over the transmittance ratio (as explained with reference to FIG. 5 and FIG. 6) can be performed in combination.

Embodiment 3.

Figure 7:
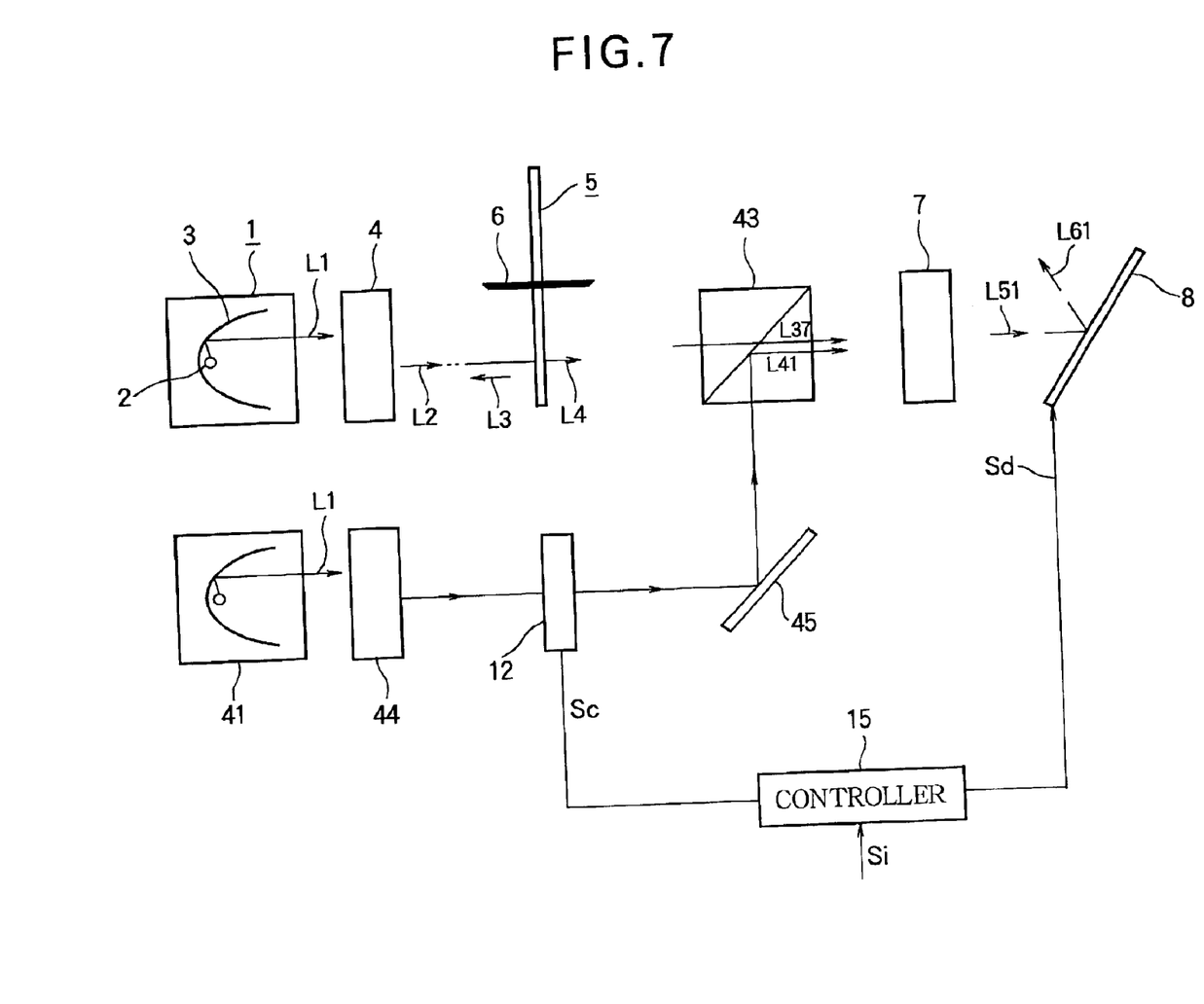
FIG. 7 is a drawing showing the configuration of the image projection apparatus of Embodiment 3 of this invention.

In Embodiment 1 and Embodiment 2, the light reflected at the incident surface 60a of the color wheel is guided to the light shutter 12. However, the light other than the light reflected at the incident surface 60a of the color wheel 51 may be guided to the light shutter 12, and the light having passed through the light shutter 12 may be combined with the light having passed through the color wheel. For instance, as shown in FIG. 7, a light source 41, which is separate from the light source 1 emitting the light directed to the color wheel, is provided, and the light from the light source 41 is passed through an optical means 44 similar to the optical means 4, the light shutter 12, and a light guiding means 45 similar to the light guiding means 11b, and are combined at a synthesizer such as a dichroic prism 43, and the combined light may be guided to the spatial optical modulator 8. In this case, the color wheel 51 may be one having an axis of rotation coinciding with the direction in which the incident light travels (i.e., the same as the one shown in the prior art example of FIG. 8). For this reason, the color wheel in FIG. 7 is identified by the reference numeral 5, identical to that in FIG. 8.

In Embodiments 1 to 3, the light shutter 12 is formed of a liquid crystal shutter. The light shutter 12 may however be of any other configuration. Moreover, in the embodiments described, the color filters are dichroic filters, but other types of color filters may be used in place. Furthermore, in the embodiments described, the sequential color selecting means is formed of a plate-shaped member held to be rotatable about an axis of rotation, and the plate-shaped member is divided by lines extending radially from the axis of rotation into three or more regions, and at least three of these regions have color filters of three primary colors of red, green and blue. The invention is not limited to such an arrangement, and any other type of filters may be used.

In Embodiments 1 to 3, the rotary sequential color selecting means is used, but other types of filters can be used.

What is claimed is:

1. An image projection apparatus, comprising:
   a light source for emitting light containing different color components;
   a sequential color selecting means for sequentially passing different color components of the light from said light source;
   means for generating white light;
   a spatial light modulator;
   means for guiding the light having passed through the sequential color selecting means and said white light to said spatial light modulator; and
   means for adjusting the temporal average intensity of the white light;
   wherein said spatial light modulator spatially modulates the light having passed through the sequential color selecting means and the white light with is temporal average intensity having been adjusted, to generate image light.

2. The image projection apparatus as set forth in claim 1, wherein said means for adjusting the temporal average intensity of the white light includes a liquid crystal shutter.

3. The image projection apparatus as set forth in claim 1, wherein said means for generating the white light includes means for combining the light reflected at the sequential color selecting means and the light having passed through the sequential color selecting means.

4. The image projection apparatus as set forth in claim 3, wherein said means for adjusting the temporal average intensity of the white light adjusts the light reflected at the sequential color selecting means, to thereby adjust the temporal average intensity of the white light indirectly.

5. The image projection apparatus as set forth in claim 3, wherein said sequential color selecting means has a plurality of color filters, which are formed of dichroic filters, and the light reflected at an incident surface of the sequential color selecting means is guided to an exit surface of the sequential color selecting means so that it is combined with the light having passed through the sequential color selecting means.

6. The image projection apparatus as set forth in claim 1, wherein said sequential color selecting means includes a plate member held rotatably about an axis of rotation, said plate member is divided into three or more regions by lines extending in radial directions from the axis of rotation, and at least three of the regions have color filters of three primary colors of red, green and blue.

7. The image projection apparatus as set forth in claim 1, wherein said spatial light modulator comprises a digital micromirror device.

8. The image projection apparatus as set forth in claim 1, further including a controller for adjusting the temporal average intensity depending on the contents of an image signal representing the image to be projected.

9. An image projection apparatus, comprising:
   a light source for emitting light containing different color components;
   a sequential color selecting means for sequentially passing different color components of the light from said light source;
   a spatial light modulator;
   means for guiding the light having passed through the sequential color selecting means and light reflected at said sequential color selecting means to said spatial light modulator; and
   adjusting means which reduce the temporal average intensity of the reflected light;
   wherein said spatial light modulator spatially modulates simultaneously the light having passed through the sequential color selecting means and the reflected light with its temporal average intensity having been adjusted, to generate image light.

10. The image projection apparatus as set forth in claim 9, wherein a rate of reduction by the adjusting means is variable.

11. An image projection apparatus, comprising:
    a light source for emitting an initial light of a plurality of color components;
    a sequential color selector configured to allow one or more color components of the initial light to pass through as a passed-thru light and to reflect remaining color components as a reflected light;
    a light intensity adjuster configured to dynamically adjust an intensity of the reflected light as an intensity adjusted light; and
    a spatial light modulator configured to spatially modulate the passed-thru light and the intensity adjusted light to generate an image light.

12. The image projection apparatus as set forth in claim 11, further including a controller configured to provide a control signal such that said light intensity adjuster adjusts the intensity of the intensity adjusted light based on the control signal.

13. The image projection apparatus as set forth in claim 12, wherein the control signal is based a content of an image signal representing an image to be projected.

14. The image projection apparatus as set forth in claim 12, wherein said controller is configured to provide signals to synchronize operations of said sequential color selector, said light intensity adjuster, and spatial light modulator with each other.

15. The image projection apparatus as set forth in claim 14, wherein said light intensity adjuster is configured to adjust the intensity of the intensity adjusted light in one or both of duration and attenuation level.

16. The image projection apparatus as set forth in claim 15, wherein said light intensity adjuster includes a light shutter.

17. The image projection apparatus as set forth in claim 16, wherein the passed-thru light includes only a single color component.

18. The image projection apparatus as set forth in claim 17, wherein the passed-thru light includes one of red, blue, and green color components and the reflected light includes the other two color components.

19. The image projection apparatus as set forth in claim 11, wherein aid sequential color selector is held rotatably about an axis of rotation, wherein said sequential color selector is divided into at least three color regions extending in a radial direction from the axis of rotation.

20. The image projection apparatus as set forth in claim 19, further including a first light converging device configured to converge the initial light from said light source substantially in a first direction toward an incident surface of said sequential color selector, wherein the axis of rotation of said sequential color selector is inclined at a predetermined angle $\theta$ with respect to the first direction such that the reflected light is reflected from said incident surface of said sequential color selector.

21. The image projection apparatus as set forth in claim 20, further including a light guide optically placed between said sequential light selector and said light intensity adjuster to guide the reflected light to said light intensity adjuster.

22. The image projection apparatus as set forth in claim 21, further including a light collimator optically placed between said sequential light selector and said light guide, wherein said light collimator is configured to collimate the reflected light into a collimated light with a predetermined cross section size prior to being guided by said light guide.

23. The image projection apparatus as set forth in claim 21, further including one or more light guides optically placed between said light intensity adjuster and said sequential color selector to guide the intensity adjusted light to an exit surface of said sequential color selector upon which the intensity adjusted light is reflected such that both the intensity adjusted light and the passed-thru light exiting said exit surface are directed toward said spatial light modulator.

24. The image projection apparatus as set forth in claim 23, further including a light collimator optically placed between last of said one or more light guides and said sequential color selector, wherein said light collimator is configured to collimate the intensity adjusted light into a collimated light to be incident on said exit surface of said sequential color selector.

25. The image projection apparatus as set forth in claim 23, further including a second light converging device configured to converge the passed-thru light and the intensity adjusted light to said special light modulator.

26. The image projection apparatus as set forth in claim 25, wherein said sequential color selector is divided into three color regions.

27. The image projection apparatus as set forth in claim 26, wherein the passed-thru light includes one of red, blue, and green color components and the reflected light includes the other two color components.

28. The image projection apparatus as set forth in claim 27, wherein said light intensity adjuster is configured to adjust the intensity of the intensity adjusted light in one or both of duration and attenuation level.

29. An image projection apparatus, comprising:
a first light source for emitting an first light of a plurality of color components;
a sequential color selector configured to allow one or more color components of the first light to pass through as a passed-thru light;
a second light source for emitting a second light of a plurality of color components;
a light intensity adjuster configured to dynamically adjust an intensity of the second light as an intensity adjusted light; and
a spatial light modulator configured to spatially modulate the passed-thru light and the intensity adjusted light to generate an image light.

30. The image projection apparatus as set forth in claim 29, further including a controller configured to provide a control signal such that said light intensity adjuster adjusts the intensity of the intensity adjusted light based on the control signal.

31. The image projection apparatus as set forth in claim 30, wherein the control signal is based a content of an image signal representing an image to be projected.

32. The image projection apparatus as set forth in claim 30, wherein said controller is configured to provide signals to synchronize operations of said sequential color selector, said light intensity adjuster, and spatial light modulator with each other.

33. The image projection apparatus as set forth in claim 32, wherein said light intensity adjuster is configured to adjust the intensity of the intensity adjusted light in one or both of duration and attenuation level.

34. The image projection apparatus as set forth in claim 33, wherein the passed-thru light includes only a single color component.

35. The image projection apparatus as set forth in claim 34, further including a light combiner optically placed between said sequential color selector and said spatial light modulator and between said light intensity adjuster and said spatial light modulator, said light combiner configured to combine the passed-thru light and the intensity adjusted light direct the combined light to said spatial light modulator.

36. The image projection apparatus as set forth in claim 35, wherein said light combiner includes a prism such that the passed-thru light entering a first entrance surface of said prism exits an exit surface and the intensity adjust light entering a second entrance surface exits said exit surface.

37. The image projection apparatus as set forth in claim 36, wherein said light combiner further includes a light guide optically placed between said light intensity adjuster and said prism, said light guide is configured to guide intensity adjusted light from said light intensity adjuster to said second entrance surface of said prism.

38. The image projection apparatus as set forth in claim 36, wherein said sequential color selector is divided into three color regions.

39. The image projection apparatus as set forth in claim 38, wherein the passed-thru light includes one of red, blue, and green color components.

* * * * *